US012254391B2

(12) United States Patent
Goergen et al.

(10) Patent No.: US 12,254,391 B2
(45) Date of Patent: Mar. 18, 2025

(54) GUEST-SPECIFIC ARTIFICIAL INTELLIGENCE ENTITY SYSTEMS AND METHODS

(71) Applicant: Universal City Studios LLC, Universal City, CA (US)

(72) Inventors: Patrick John Goergen, Orlando, FL (US); Timothy Tryzbiak, Saint Cloud, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/316,092

(22) Filed: May 11, 2023

(65) Prior Publication Data

US 2023/0367988 A1 Nov. 16, 2023

Related U.S. Application Data

(60) Provisional application No. 63/340,790, filed on May 11, 2022.

(51) Int. Cl.
| | | |
|---|---|---|
| *G06F 3/048* | (2013.01) | |
| *G06N 3/006* | (2023.01) | |
| *G06V 20/52* | (2022.01) | |
| *H04L 67/306* | (2022.01) | |
| *H04L 67/50* | (2022.01) | |

(52) U.S. Cl.
CPC ............ *G06N 3/006* (2013.01); *G06V 20/52* (2022.01); *H04L 67/306* (2013.01); *H04L 67/535* (2022.05)

(58) Field of Classification Search
CPC ...... G06N 3/006; G06V 20/52; H04L 67/535; H04L 67/306
See application file for complete search history.

(56) References Cited

U.S. PATENT DOCUMENTS

| | | | |
|---|---|---|---|
| 6,796,908 B2 | 9/2004 | Weston | |
| 7,955,168 B2 | 6/2011 | Mendelsohn et al. | |
| 8,342,929 B2 | 1/2013 | Briggs et al. | |
| 10,322,353 B1 | 6/2019 | Goergen et al. | |
| 10,679,397 B1 * | 6/2020 | Churchill | G06V 40/161 |
| 10,695,689 B2 * | 6/2020 | Weston | A63J 1/02 |
| 10,769,909 B1 * | 9/2020 | Modestine | G06V 20/52 |

(Continued)

OTHER PUBLICATIONS

PCT/US2023/021936 International Search Report and Written Opinion mailed Aug. 30, 2023.

*Primary Examiner* — David Phantana-angkool
(74) *Attorney, Agent, or Firm* — Fletcher Yoder P.C.

(57) ABSTRACT

Systems and methods presented herein include guest activity detection devices configured to detect activity of guests of an amusement park, and to send data indicative of the detected activity; an artificial intelligence entity management system configured to analyze the data indicative of the activity of the guests, and to modify properties of guest-specific artificial intelligence entities based at least in part on the analyzed data indicative of the activity of the guests; and park features disposed within a physical environment of the amusement park and configured to be instructed by the guest-specific artificial intelligence entities to modify a guest experience for the guests of the amusement park in accordance with the properties of the guest-specific artificial intelligence entities.

24 Claims, 5 Drawing Sheets

(56) References Cited

U.S. PATENT DOCUMENTS

| | | | | |
|---|---|---|---|---|
| 11,797,079 | B2* | 10/2023 | Lugo | A63F 13/42 |
| 2019/0043281 | A1* | 2/2019 | Aman | G07C 9/215 |
| 2019/0201806 | A1* | 7/2019 | Weston | A63G 31/16 |
| 2020/0215442 | A1* | 7/2020 | Leiba | A63G 31/16 |
| 2021/0097893 | A1* | 4/2021 | Klappert | G06F 16/9024 |
| 2021/0240969 | A1* | 8/2021 | Edelen | G06F 16/51 |
| 2021/0268984 | A1* | 9/2021 | Krauthamer | A63G 25/00 |
| 2021/0271881 | A1 | 9/2021 | Traynor et al. | |
| 2022/0054948 | A1* | 2/2022 | Yeh | G16H 40/63 |
| 2022/0174451 | A1* | 6/2022 | Lugo | H04W 4/021 |
| 2023/0341992 | A1* | 10/2023 | Berquam | G06F 3/04815 |
| 2023/0351832 | A1* | 11/2023 | Galley | G07C 9/29 |
| 2023/0367988 | A1* | 11/2023 | Goergen | G06N 3/006 |
| 2023/0410358 | A1* | 12/2023 | Lin | A63G 7/00 |
| 2024/0012471 | A1* | 1/2024 | Lugo | A63F 13/424 |
| 2024/0082743 | A1* | 3/2024 | Rell | G06N 5/022 |
| 2024/0095472 | A1* | 3/2024 | Rodgers | G06K 7/10297 |

* cited by examiner

GUEST-SPECIFIC ARTIFICIAL INTELLIGENCE ENTITY SYSTEMS AND METHODS

CROSS-REFERENCE TO RELATED APPLICATION

This application claims priority to and the benefit of U.S. Provisional Application No. 63/340,790, entitled "GUEST-SPECIFIC ARTIFICIAL INTELLIGENCE ENTITY SYSTEMS AND METHODS," filed May 11, 2022, which is hereby incorporated by reference in its entirety for all purposes.

BACKGROUND

The present disclosure relates generally to the field of amusement parks. More specifically, embodiments of the present disclosure relate to systems and methods for enabling guest-specific artificial intelligence entities.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks include a variety of features providing unique experiences to each park guest. Some features may include a ride vehicle that may travel along a specific path. The path may include elements such that, as the ride vehicle travels along the path, those elements may enhance a guest's experience. For example, the ride vehicle may enter and exit several rooms when traveling along the path, where there are elements inside of each room to enhance a guest's experience. However, it is now recognized that the ability to create more complex (and customized) experiences may further enhance guest experiences.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system includes one or more guest activity detection devices configured to detect activity of one or more guests of an amusement park, and to send data indicative of the detected activity. The system also includes an artificial intelligence entity management system configured to analyze the data indicative of the activity of the one or more guests, and to modify one or more properties of one or more guest-specific artificial intelligence entities based at least in part on the analyzed data indicative of the activity of the one or more guests. The system further includes one or more park features disposed within a physical environment of the amusement park and configured to be instructed by the one or more guest-specific artificial intelligence entities to modify a guest experience for the one or more guests of the amusement park in accordance with the one or more properties of the one or more guest-specific artificial intelligence entities.

In addition, in certain embodiments, a method includes detecting, via one or more guest activity detection devices, data activity of one or more guests of an amusement park. The method also includes sending, via the one or more guest activity detection devices, data indicative of the detected activity of the one or more guests. The method further includes analyzing, via at least one processor, the data indicative of the activity of the one or more guests. In addition, the method includes modifying, via the at least one processor, one or more properties of one or more guest-specific artificial intelligence entities based at least in part on the analyzed data indicative of the activity of the one or more guests. The method also includes instructing, via the one or more guest-specific artificial intelligence entities, one or more park features disposed within a physical environment of the amusement park to modify a guest experience for the one or more guests of the amusement park in accordance with the one or more properties of the one or more guest-specific artificial intelligence entities.

In addition, in certain embodiments, a system includes an artificial intelligence entity management system configured to modify one or more properties of one or more guest-specific artificial intelligence entities associated with one or more guests of an amusement park based at least in part on detected activity of the one or more guests. The system also includes one or more park features disposed within a physical environment of the amusement park, wherein the one or more park features are configured to be instructed by the one or more guest-specific artificial intelligence entities to modify a guest experience for the one or more guests of the amusement park in accordance with the one or more properties of the one or more guest-specific artificial intelligence entities.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
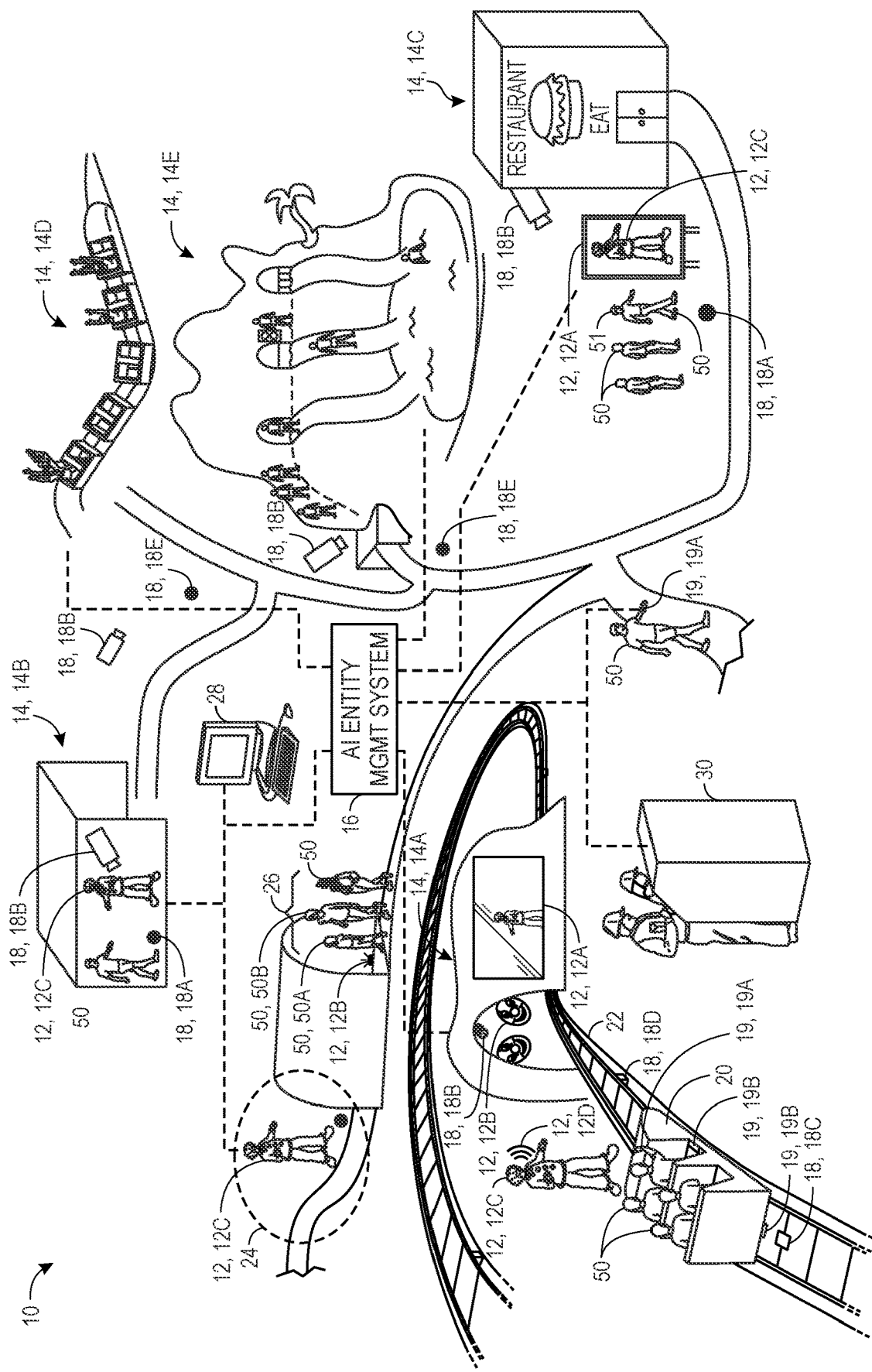
FIG. 1 is a schematic representation of an amusement park with guest-specific artificial intelligence (AI) entities, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to systems and methods for managing guest-specific artificial intelligence (AI) entities, which may have particular identities, character details, personality traits, moods, preferences, and so forth, which may be modified based on activity of guests (e.g., directly associated with the AI entities) within an amusement park, which may be monitored by various sensors disposed within the amusement park. Each AI entity may be specific to a particular guest and, as the guest moves about the amusement park, the AI entity that is specific to the guest may be periodically manifested via various park features, such as displays, lighting effect systems, animated figures, sound effect systems, and so forth. As such, the guest-specific AI entities may function as "ghosts" that follow their respective guests around the amusement park and present themselves at appropriate times to provide a heightened sense of immersion, for example, relating to certain themed zones within the amusement park.

In addition, in certain embodiments, the guest-specific AI entities may exist within a digital environment, as opposed to the physical environment of the amusement park, may move about the digital environment separately from the associated guests' movements within the physical environment of the amusement park, and may act as the triggering sources of actions within the physical environment of the amusement park that correspond to the guest-specific AI entities' locations and/or actions within the digital environment (e.g., that correspond to the physical environment of the amusement park). In particular, the guest-specific AI entities may learn from the activity of their associated guests and may interact with the digital environment in a manner that the guest-specific AI entities are taught to believe would be consistent with their associated guests' behavior. As but one non-limiting example, Google Maps and other online mapping platforms may represent one version of a digital parallel world that directly corresponds to the real, physical world. In certain embodiments, a guest-specific AI entity may walk about Google Maps and have a global positioning system (GPS) coordinate the correlates to the physical world. This GPS position of the guest-specific AI entity may function as a trigger source for a virtual sensor (e.g., a sensor in the digital world) that may impact the physical world or start a real-world simulated interaction, as described in greater detail herein. Of course, the digital world is not constrained by the physical world, but can have representative constraints, parallel constraints, non-relational constraints (e.g., a constraint that does not pertain to the physical world), partially represents real-world constraints, or attempts to fully be constrained by the physical world.

Turning to the drawings, FIG. 1 is a schematic representation of an amusement park 10 with guest-specific AI entities. In particular, the amusement park 10 includes one or more park features 12 (e.g., a display 12, 12A, a lighting effect system 12, 12B, an animated FIGS. 12, 12C, and/or a sound effect system 12, 12D) that may be modified for a particular guest 50, on or around various locations (e.g., attractions, zones, pathways, or other areas of the amusement park 10). As described in greater detail herein, the one or more park features 12 may collectively function as an AI manifestation system configured to manifest the existence of AI entities that are specific to certain guests 50 of the amusement park 10.

In the illustrated embodiment, the amusement park 10 includes multiple attractions 14 including tunnel ride attractions 14, 14A, virtual game room attractions 14, 14B, restaurant attractions 14, 14C, roller coaster attractions 14, 14D, and water attractions 14, 14E, among other attractions. As described in greater detail herein, different embodiments of the park features 12 may be found throughout the amusement park 10, and an AI entity management system 16 may activate interactions from the park features 12 to react in a manner that the guests 50 perceive as a response from an AI entity that is specific to the particular guest 50 based at least in part on guest data collected by various sensors 18 disposed within the amusement park 10.

For example, in certain embodiments, a tunnel ride attraction 14, 14A and a restaurant attraction 14, 14C may include displays 12, 12A that display images of an animated FIG. 12, 12C. In response to detecting a particular guest 50, such as detecting the particular guest 50 using proximity sensors 18, 18A or visual sensors to detect and/or determine a human presence and the cameras 18, 18B to identify the particular guest 50, the AI entity management system 16 may cause a particular animated FIG. 12, 12C to react based at least in part on guest data collected for the particular guest 50, as described in greater detail herein. Moreover, in certain embodiments, a virtual representation (e.g., virtual embodiment, hologram, image, animation) of the animated FIG. 12, 12C in a virtual environment (e.g., virtual game in a virtual game room) 14, 14B may react similarly.

As another non-limiting example, in certain embodiments, the AI entity management system 16 may determine that a particular guest 50 is presently on a tunnel ride attraction 14, 14A, for example, using data received from an electronic reader 18, 18C disposed proximate a ride track 22 that has detected the data (e.g., received a signal from, scanned, and so forth) from a guest-wearable readable identifier (ID) 19, 19A (e.g., a radio frequency identification (RFID) tag, a bar code, or other type of tag, code, and so forth, which may be readable by the electronic reader 18, 18C) associated with the particular guest 50. As illustrated, in certain embodiments, a ride vehicle 20 of a tunnel ride attraction 14, 14A may also include one or more readable IDs 19, 19B, which may be read by an electronic reader 18, 18C. In certain embodiments, as the ride vehicle 20 moves along ride tracks 22, an electronic reader 18, 18C on the ride track 22 may read (e.g., receive a signal from, scan, and so forth) the readable ID(s) 19, 19B of the ride vehicle 20, indicating presence of the ride vehicle 20. Based on the ride vehicle 20 being present and moving along the ride tracks 22, the AI entity management system 16 may determine that a particular guest 50 is present within a threshold distance (e.g., threshold range) of interest, such as within a distance (e.g., threshold range) near one or more park features 12 that may be instructed to simulate the existence of an AI entity associated with the particular guest 50, as described in greater detail herein. For example, the AI entity management system 16 may use data indicating that the particular guest 50 is riding a particular ride vehicle 20 that has been collected by the AI entity management system 16 (e.g., at the beginning of a ride). Additionally or alternatively, a force sensor (e.g., weight sensor) 18, 18D positioned on the ride track 22 may detect a force (e.g., weight) above a threshold force (e.g., weight) when the ride vehicle 20 moves over the force sensor (e.g., weight sensor) 18, 18D, indicating presence of the ride vehicle 20.

In certain embodiments, after determining that the ride vehicle 20 is present and a particular guest 50 is likely present, the AI entity management system 16 may instruct additional sensors 18 to collect and/or transmit data to the AI entity management system 16 (e.g., to assist in identifying the particular guest 50). For example, in certain embodiments, the AI entity management system 16 may perform image analysis of data (e.g., video and/or images) collected by a camera 18, 18B to match an image collected by the camera 18, 18B to one corresponding to a user ID associated with the particular guest 50. For example, the video and/or images collected by the camera 18, 18B may be compared to a library of images stored by the AI entity management system 16 to match a particular guest 50 (e.g., using image recognition algorithms) and determine the user ID based on the identification. Additionally or alternatively to the camera 18, 18B, the AI entity management system 16 may analyze readable ID data collected by an electronic reader 18, 18C to associate it with user ID associated with the particular guest 50. In certain embodiments, the AI entity management system 16 may determine the presence of and identify the particular guest 50 using a camera 18, 18B and/or an electronic reader 18, 18C rather than initially determining the presence of the particular guest 50, for example, based on the weight of the ride vehicle 20.

After identifying the guest 50, the AI entity management system 16 may analyze guest data for the particular guest 50, and subsequently modify interactions of the tunnel ride attraction 14, 14A based on the guest data. For example, in certain embodiments, the guest data may indicate that the particular guest 50 fears clowns. In particular, the AI entity management system 16 may determine that the particular guest 50 made a statement (e.g., captured by a sound sensor 18, 18E at another attraction 14) that they are afraid of clowns. In addition, in certain embodiments, data may be communicated through certain sounds that are detected by a sound sensor 18, 18E such that the sounds may function as a sound-based data waveform, which may be processed by the AI entity management system 16 for the purpose of providing information relating to activity of the particular guest 50 with respect to the amusement park 10. As used herein, the terms "sound" and "audio" may be used in the same context and, indeed, may be mentioned together.

In addition, in certain embodiments, one or more of the sensors 18 described herein may be part of guest mobile devices 34 associated with the guests 50. For example, in certain embodiments, one or more of the sensors 18 may be integrated into a mobile phone or tablet associated with a particular guest 50. In addition, in certain embodiments, one or more of the sensors 18 may be integrated into an object (e.g., wearable device, toy, mobile phone, tablet, and so forth) 51 associated with (e.g., worn by, carried by, owned by) a particular guest 50. In such embodiments, a guest mobile devices 34 and/or guest-associated object 51 may be registered with the AI entity management system 16 to enable the AI entity management system 16 to track data detected by the sensors 18 integrated into the guest mobile device 34 and/or sensors 18 integrated with the guest associated object 51. In certain embodiments, a sensor 18 integrated with a guest mobile device 34 and/or a sensor integrated with a guest-associated object 51 may detect and/or determine the presence of the associated guest 50 at particular locations within the physical environment of the amusement park 10, may capture data regarding the associated guest 50 (e.g., video, images, and/or sound of the associated guest 50, and so forth), as described in greater detail herein.

As described in greater detail herein, the AI entity management system 16 may instruct activating and/or deactivating the park features 12 and/or instruct adjustment (e.g., customization) of the output (e.g., actuation, visual output, audio output) of the park features 12 based on data collected about a particular guest 50 by the sensors 18. For example, a particular park animated feature 12, 12C may call out to the particular guest 50, ask about a game that the particular guest 50 played earlier at the amusement park 10, ask about a family member of the particular guest 50 by name, make comments related to amusement park zones that the particular guest 50 visited, and so forth (e.g., via an associated sound effect system 12, 12D) as the ride vehicle 20 the particular guest 50 is riding approaches the animated feature 12, 12C. Thus, the AI entity management system 16 may instruct the park features 12 disposed about the amusement park 10 based on the guest data determined by the sensors 18. In addition, in certain embodiments, the AI entity management system 16 may cause (e.g., instruct) the animated FIG. 12, 12C, for example, to make faces and/or gestures based on the guest data (e.g., make faces and/or gestures based on guest data (e.g., data indicative of what the particular guest 50 may think is funny) that may make the particular guest 50 laugh, make faces and/or gestures based on guest data (e.g., data indicative of what the particular guest 50 may be afraid of) that may scare the particular guest 50).

By way of example, the guest data (e.g., number of tickets purchased for the amusement park 10, number of known friends and family members having been identified as being in the amusement park 10 for a particular time frame (e.g., on a particular day, during a particular weekend, during a particular week, and so forth), number of attractions 14 visited, number of times each attraction has been visited, total length of time visiting each attraction, and so forth) may indicate that the particular guest 50 is visiting the amusement park 10 with one or more other people (e.g., friends, family members) and, thus, the AI entity management system 16 retrieves data related to the one or more other people (e.g., friend and/or family member name tagged on a social media application, for example). In addition, in certain embodiments, during the ride on the tunnel ride attraction 14, 14A, the AI entity management system 16 may analyze video data from the camera 18, 18B that indicates that the particular guest 50 is on the ride vehicle 20 with one or more other guests, and may determine that the other guests are friends and/or family members and/or otherwise in a group together. In certain embodiments, the AI entity management system 16 may perform additional image analysis to match captured video data to images on a social media application to confirm identity of the other guests. Thus, the AI entity management system 16 may address the other guests by their respective names, providing a customized interaction for the particular guest 50 and/or the other guests. However, in certain embodiments, the particular guest 50 may control the data shared with the AI entity management system 16 and, as such, the extent of interactivity may correspond to the extent of data that is shared. For example, the limitations may cause the AI entity management system 16 to limit the interactions to addressing only the guest 50 by name and not the other guests.

In certain embodiments, the tunnel ride attraction 14, 14A may include other sound effect systems 12, 12D that the AI entity management system 16 modifies based on the guest data. For example, in certain embodiments, the AI entity management system 16 may cause (e.g., instruct) the sound effect system 12, 12D to play audio associated with the particular guest's favorite attraction 14 (e.g., theme song, tag line, dialogue, sound effect). In addition, in certain embodiments, the AI entity management system 16 may cause a lighting effect system 12, 12B to project imagery (e.g., clown faces, animals) in the tunnel of the tunnel ride attraction 14, 14A based on the guest data for the particular guest 50. In addition, in certain embodiments, the park features 12 may dynamically change based on the particular guest 50 being positioned within a threshold distance from the park features 12, as described in greater detail herein. Based on the guest location relative to a particular park feature 12, the AI entity management system 16 may instruct the output of the park features 12 based on the particular guest 50. For example, in certain embodiments, the AI entity management system 16 may instruct activating, deactivating, and/or customizing output of park features 12 on the left side of the tunnel ride attraction 14, 14A for a particular guest 50 positioned on the left side of the ride vehicle 20 and/or may instruct activating, deactivating and/or customizing output of park features 12 on the right side of the tunnel ride attraction 14, 14A for a particular guest 50 positioned on the right side of the ride vehicle 20. Similarly, the AI entity management system 16 may instruct activating, deactivating, and/or customizing the output of the park features 12 for a second guest 50, 50B (e.g., project spiders in the tunnel for the second guest 50, 50B on the next ride vehicle 20) as a first guest 50, 50A moves out of range from the park features 12 and the second guest 50, 50B moves within range from the park features 12 (e.g., as the ride vehicles 20 move along the ride track 22).

In addition, in certain embodiments, the AI entity management system 16 may instruct (e.g., instruct activation, instruct deactivation, instruct customization of output) of an animated FIG. 12, 12C based on a particular identified guest 50 in closest proximity and within a threshold range 24 from the animated FIG. 12, 12C. As shown, in a group 26 of guests 50, the AI entity management system 16 may instruct the animated FIG. 12, 12C to react to the guest 50 that is the first guest 50 to be within the threshold range 24. Then, the AI entity management system 16 may stop and/or switch (e.g., customize) the interactions (e.g., to a second guest 50, 50B to be within the threshold range 24) after a first guest 50, 50A is out of the threshold range 24 and/or after a predetermined time for interacting with the first guest 50. In certain embodiments, the AI entity management system 16 may also cause varied interactions depending on groups 26 of guests 50 (e.g., a first interaction when a first guest 50, 50A is present, a second interaction when a second guest 50, 50B is present, a third interaction when the first guest 50, 50A and the second guest 50, 50B are present together, and so forth) and a combination of preferences of individuals in the group 26. For example, in certain embodiments, an overlap of interest between a majority of group members may be identified and used to provide interactions, random selections or combinations of interactions may be instructed based on preferences of those in the group, interactions may be cycled through based on group preferences, and so forth. In certain embodiments, the AI entity management system 16 may instruct an animated FIG. 12, 12C to turn around to provide modified interactions when a particular guest 50 is within the threshold range 24 but is not facing the animated FIG. 12, 12C.

The embodiments described above with reference to FIG. 1 are primarily directed to tracking physical activity of guests 50 of the amusement park 10 for the purpose of creating physical interactions in the physical environment of the amusement park 10 to simulate the presence of guest-specific AI entities 36 in the physical environment of the amusement park 10. However, in certain embodiments, the guest-specific AI entities 36 may exist in a digital environment separate from (e.g., but, perhaps, directly corresponding (e.g., coupled with, linked to)) the physical environment of the amusement park 10, and may take actions separate from the actions of their associated guests 50 that create the physical interactions in the physical environment of the amusement park 10, as described in greater detail herein.

In addition, in certain embodiments, a monitoring system 28 and/or a service desk 30 may monitor the amusement park 10 and the AI entity management system 16 to ensure that the park operations are completed as expected. In particular, as described in greater detail herein, the interactions with particular guests 50 that may occur via the various park features 12 described herein are intended to simulate the existence of one or more AI entities that are specific to the particular guests 50, and which develop particular "personality traits" based on all of the previous activity of the particular guests 50 relative to the amusement park 10, for example, as detected and/or determined by the various sensors 18 described herein.

Figure 2:
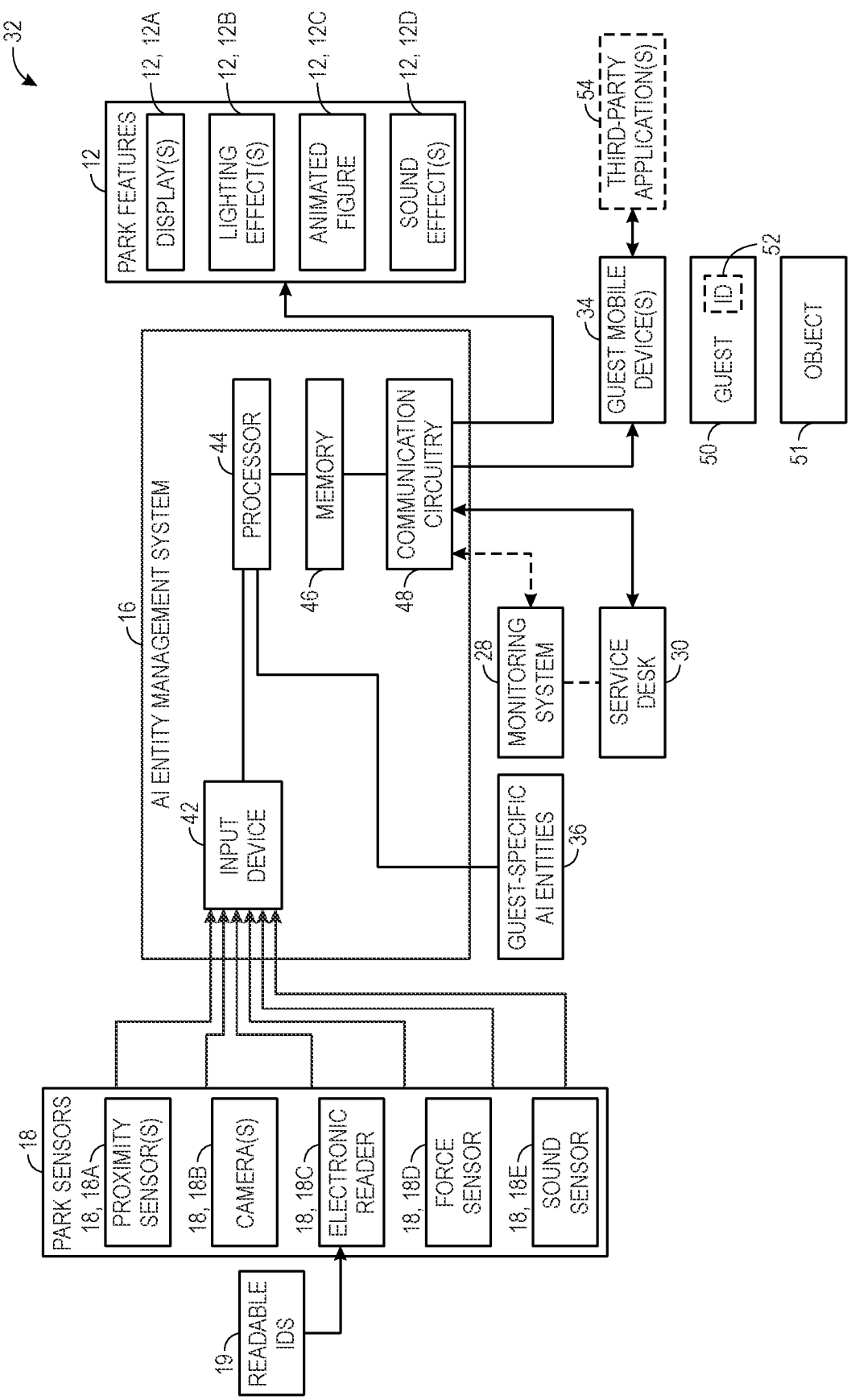
FIG. 2 depicts a guest-specific AI entity system for instructing park features of the amusement park of FIG. 1 to simulate the existence of guest-specific AI entities, in accordance with an embodiment of the present disclosure.

To illustrate how the AI entity management system 16 maintains the guest-specific AI entities 36 described herein, FIG. 2 depicts a guest-specific AI entity system 32 for instructing park features 12 of the amusement park 10 of FIG. 1 to simulate the existence of guest-specific AI entities 36. As illustrated, the guest-specific AI entity system 32 includes sensors 18, the AI entity management system 16, park features (e.g., attraction features) 12, and one or more guest mobile devices 34, among other devices. It should be understood that the illustrated system is merely intended to be exemplary, and that certain features and components may be omitted and various other features and components may be added to facilitate performance, in accordance with the disclosed embodiments.

It should be noted that, while described primarily as being directly managed by the AI entity management system 16, in other embodiments, the guest-specific AI entities 36 may represent portable and/or evolving code (e.g., a portable and/or evolving snippet of code) that can be dynamically injected into the programming of the park features 12 (e.g., via edge computing or as a chip that may be plugged into the AI entity management system 16). In other words, in certain embodiments, the guest-specific AI entities 36 may be developed and/or managed at least partially separately from the AI entity management system 16. For example, in certain embodiments, the guest-specific AI entities 36 may not exist within the AI entity management system 16. Rather, in such embodiments, the physical interactions caused by the AI entity management system 16 in the physical environment of the amusement park 10 may be managed by the AI entity management system 16, but the actual guest-specific AI entities 36 may not be managed by the AI entity management system 16.

In addition, while described primarily herein as utilizing guest-specific AI entities 36 that are directly related to guests 50 and that manifest themselves based on activity of those particular guests, in certain embodiments, the guest-specific AI entities 36 may be associated with other guests that are related to a particular guest in some manner. For example, in certain embodiments, a guest-specific AI entity 36 may be associated with a parent of a particular guest 50 (e.g., a child of the parent), and may be configured by the parent to manage and interact with particular guest 50 as they move about the amusement park 10. As such, in certain embodiments, the guest-specific AI entities 36 may function as a digitally-run monitoring system (e.g., day care system) for children visiting the amusement park 10. In particular, parents may configure the guest-specific AI entities 36 to function in particular ways with respect to guiding their children (e.g., with respect to a certain theme of the amusement park 10, and so forth); however, the AI entity management system 16 may modify the configuration of the guest-specific AI entities 36. In addition, in certain embodiments, the AI entity management system 16 may aggregate multiple guest-specific AI entities 36 into an aggregate AI entity, which may for example represent an amalgam of certain personality traits of interest for a particular group of guests 50.

As illustrated in FIG. 2, in certain embodiments, the AI entity management system 16 may include an input device 42, a processor 44, a memory 46, and communication circuitry 48. In certain embodiments, the input device 42 may receive input data from the sensors 18. Based on the input data received at the input device 42, the AI entity management system 16 may manage the guest-specific AI entities 36 by, for example, modifying artificial personalities of the guest-specific AI entities 36, instructing various park features 12 to manifest the existence of the guest-specific AI entities 36, and so forth. In particular, in the amusement park setting described herein (and illustrated in FIG. 1), the AI entity management system 16 may control (e.g., instruct, for example, instruct outputs of) park features 12 such as displays 12, 12A, lighting effect systems 12, 12B, animated FIGS. 12, 12C, and/or sound effect systems 12, 12D. As described above with respect to FIG. 1, the amusement park 10 may include attractions 14 throughout the amusement park 10, such as tunnel ride attractions 14, 14A, virtual game room attractions 14, 14B, restaurant attractions 14, 14C, roller coaster attractions 14, 14D, and water attractions 14, 14E, among other attractions, and so forth, that may include one or more of the park features 12. By way of example, a tunnel ride attraction 14, 14A may include a lighting effect system 12, 12B, one or more animated FIGS. 12, 12C, and/or a sound effect system 12, 12D, while a pathway at the amusement park 10 may include one or more animated FIGS. 12, 12C and one or more displays 12, 12A. Moreover, in certain embodiments, the amusement park 10 may be divided into multiple zones organized by themes and/or age group. By way of example, a zone of the amusement park 10 organized by a particular theme may include a heavier focus or revolve around a particular subject associated with a particular theme.

As described in greater detail herein, the AI entity management system 16 may control (e.g., instruct) the park features 12 to provide customized interactions for the guest 50. By way of example, the AI entity management system 16 may control (e.g., instruct) a speaker of a sound effect system 12, 12D on a tunnel ride attraction 14, 14A to produce audio associated with a guest-specific AI entity 36 associated with a particular guest 50. For example, the audio may include recognizable and unique sounds (e.g., music (e.g., a song), specific tone, pattern of noise) associated with a particular AI entity 36) and/or the guest's name. The customized audio may be based on guest data acquired by the sensors 18 described herein. As another example, the AI entity management system 16 may control (e.g., instruct) a lighting effect system 12, 12B to project specific animations during a ride (e.g., on a ride tunnel wall) based on the guest data. For example, the AI entity management system 16 may retrieve guest data from the sensors 18 that indicates the particular guest's fears, and use this guest data to modify animations projected by the lighting effect system 12, 12B (e.g., project images of spiders if the particular guest 50 is afraid of spiders and the associated AI entity 36 is associated with spiders in some way). The AI entity management system 16 may retrieve guest data from the sensors 18 that indicates the particular guest's likes, and use this guest data to modify animations projected by the lighting effect system 12, 12B (e.g., project images of puppies if the particular guest 50 likes puppies and the associated AI entity 36 is associated with puppies in some way.) In this manner, the AI entity management system 16 may control (e.g., instruct) and modify and/or customize amusement park interactions to provide a customized experience based on the guest data. Specifically, guest presence on or near certain park features 12 may trigger the AI entity management system 16 to instruct (e.g., instruct activation of, instruct deactivation of, instruct customization of) the park features 12 based on the guest data, as described in greater detail herein. In certain embodiments, the AI entity management system 16 may also determine the presence (e.g., identification, location, movement, and so forth) of a particular guest 50 using data (e.g., data indicative of identity of a particular guest 50, data indicative of location of a particular guest 50, data indicative of movement of a particular guest 50) acquired by one or more of the sensors 18 described herein. It will be appreciated that the lighting effect system 12, 12B may include any number of different types of systems configured to generate light for the purpose of displaying (e.g., via one or more displays (e.g., liquid crystal (LCD) display, light-emitting diode (LED) display, organic light-emitting diode (OLED) display)), projecting (e.g., via one or more projectors), or otherwise presenting the generated light to the guests 50.

As described above with respect to FIG. 1, the sensors 18 may include one or more proximity sensors 18, 18A, one or more cameras 18, 18B, one or more readable IDs 19, one or more electronic readers 18, 18C, one or more force sensors (e.g., weight sensors) 18, 18D, and/or one or more sound sensors 18, 18E. Some of the sensors 18 may be placed or positioned in areas where guest presence is expected, such as on a ride vehicle 20 or a ride track 22 of a ride. In certain embodiments, readable IDs 19 may communicate with the electronic readers 18, 18C to indicate a presence of a particular guest 50. For example, in certain embodiments, the readable IDs 19, 19B may be incorporated on a ride, such as on a ride track 22 or a ride vehicle 20 of the ride (e.g., inside, on the side, or on the entryway of the ride vehicle 20). In addition, the electronic readers 18, 18C may be placed in a manner that allows scanning of the readable IDs 19. By way of example, an electronic reader 18, 18C may be placed on the ride track 22 such that the electronic reader 18, 18C may scan the readable ID 19, 19B on the ride vehicle 20 as the ride vehicle 20 passes over the electronic reader 18, 18C, indicating that the particular guest 50 is on the ride. In certain embodiments, the readable IDs 19 may include guest-wearable readable IDs 19, 19A that are associated with particular user IDs 52. Thus, data from an electronic reader 18, 18C may indicate that a particular guest 50 associated with a particular user ID 52 is present upon scanning the guest-wearable readable ID 19, 19A associated with the particular guest 50. Subsequently, the AI entity management system 16 may retrieve the particular guest 50 data based on the user ID 52 and instruct the park features 12 accordingly, as described in greater detail herein.

As described in greater detail herein, the amusement park 10 may also track guest park activity, such as ride history, interactions, and so forth. By way of example, the tracked guest park activity (e.g., tracked via a guest-wearable readable ID 19, 19A) may indicate that a particular guest 50 stayed in a specific zone of the amusement park 10 for the majority of the guest's visit to the amusement park 10. The tracked guest park activity may also indicate that the particular guest 50 rode a particular ride more often than other rides. Based on this guest data, the AI entity management system 16 may determine preferences for the particular guest 50 (e.g., favorite and/or least favorite zone at the amusement park 10, favorite and/or least favorite ride at the amusement park 10, favorite and/or least favorite intellectual property used at the amusement park 10) and use these preferences to modify the artificial personality of a guest-specific AI entity 36 associated with the particular guest 50, as described in greater detail herein.

In certain embodiments, one or more cameras 18, 18B may be placed or positioned in areas based on where guest presence is expected, such as to view a ride vehicle 20 on a ride. In such embodiments, the data (e.g., images, video) captured by the cameras 18, 18B may be used to determine the presence of a particular guest 50. Specifically, the data captured by the cameras 18, 18B may be used (e.g., by a computing device, by a controller, by a processor) to determine the presence of a particular guest 50 through facial recognition and/or body recognition. In certain embodiments, the cameras 18, 18B may provide the images and/or video as input data to the AI entity management system 16, which may subsequently perform the facial recognition and/or body recognition. In certain embodiments, the cameras 18, 18B (e.g., one or more cameras comprising a processor, one or more cameras comprising a controller comprising a processor) and/or the AI entity management system 16 may match the images and/or video to previously-stored image(s) of the particular guest 50. In certain embodiments, the previously-stored image(s) of the particular guest 50 may be stored in the memory 46 of the AI entity management system 16 and associated with the user ID 52 of the particular guest 50 and/or retrievable through third party applications 54 (e.g., a guest picture (e.g., profile picture) on a social media application).

Similarly, in certain embodiments, one or more sound sensors (e.g., microphones) 18, 18E may be placed or positioned in areas based on where guest presence is expected, such as to view a ride vehicle 20 on a ride. In such embodiments, the data (e.g., sounds, vibration, and so forth) captured by the sound sensors 18, 18E may be used to determine the presence of a particular guest 50. Specifically, the data captured by the sound sensors 18, 18E may be used (e.g., by a computing device, by a controller, by a processor) to determine the presence of a particular guest 50 through sound input and voice recognition. In certain embodiments, the sound sensors 18, 18E may provide audio samples as input data to the AI entity management system 16, which may subsequently perform the sound input and voice recognition. In certain embodiments, the sound sensors 18, 18E (e.g., one or more sound sensors comprising a processor, one or more sound sensors comprising a controller comprising a processor) and/or the AI entity management system 16 may match the audio samples to previously-stored audio sample (s) of the particular guest 50. In certain embodiments, the previously-stored audio sample(s) of the particular guest 50 may be stored in the memory 46 of the AI entity management system 16 and associated with the user ID 52 of the particular guest 50 and/or retrievable through third party applications 54.

Additionally or alternatively, in certain embodiments, force (e.g., weight) sensors 18, 18D may indicate the presence of a guest 50. For example, the force (e.g., weight) sensors 18, 18D may be mounted on ride tracks 22 and may indicate presence of a ride vehicle 20 on the ride tracks 22 based on a predetermined force (e.g., predetermined weight (e.g., weight of the ride vehicle 20, percentage of weight of the ride vehicle 20)). Similarly, in certain embodiments, one or more proximity sensors 18, 18A may be placed or positioned proximate to areas where guest presence is expected. The proximity sensors 18, 18A may detect and/or determine a presence of nearby guests 50 and/or associated objects 51 without physical contact by using electromagnetic fields, light (e.g., visible light, non-visible light), and/or sound, such as capacitance sensors, laser sensor and emitter systems, light detection and ranging systems, vibration (e.g., sound) proximity sensors (e.g., ultrasonic proximity sensors), and so forth.

In certain embodiments, one or more proximity sensors (e.g., proximity sensor systems comprising emitters) 18, 18A and/or emitters associated with the proximity sensors (e.g., electromagnetic field emitters communicatively coupled with the proximity sensors) may emit an electromagnetic field or a beam of electromagnetic radiation (e.g., infrared radiation). In certain embodiments, the proximity sensors 18, 18A (e.g., proximity sensors comprising emitters (e.g., electromagnetic radiation emitters), proximity sensors without emitters (e.g., proximity sensors communicatively coupled with emitters (e.g., emitters external to the proximity sensors))) may detect and/or measure an electromagnetic field. In certain embodiments, the proximity sensors 18, 18A may detect and/or measure a return signal. In certain embodiments, the proximity sensors 18, 18A may comprise a computing device, a controller, and/or a processor. In certain embodiments, the proximity sensors 18, 18A may detect and/or determine changes in a field and/or signal (e.g., the proximity sensors may detect and/or determine a change in an emitted electromagnetic field and/or beam of electromagnetic radiation (e.g., a proximity sensor may comprise a computing device, controller, and/or processor and determine a change in an emitted electromagnetic field and/or beam of electromagnetic radiation using the computing device, controller, and/or processor).

In certain embodiments, one or more of the proximity sensors 18, 18A may communicate proximity sensor data (e.g., a detected and/or measured electromagnetic field and/or beam of electromagnetic radiation) to an offboard (e.g., external) computing device, controller, and/or processor that may use the proximity sensor data to determine a change in an emitted electromagnetic field and/or beam of electromagnetic radiation (e.g., a proximity sensor may be communicatively coupled with the AI entity management system 16 and/or a separate control system (e.g., controller, processor) that may determine a change in an emitted electromagnetic field and/or beam of electromagnetic radiation). In certain embodiments, one or more proximity sensors 18, 18A and/or a system offboard of and communicatively coupled to the one or more proximity sensors (e.g., the AI entity management system 16, a computing device, a controller, a processor) may determine a presence and/or proximity (e.g., distance from a location (e.g., distance from one or more of the proximity sensors)) of a guest 50 and/or an associated object 51 using the proximity sensor data.

In addition, in certain embodiments, data from proximity sensors 18, 18A may also be used to determine position of a guest 50 (e.g., using data from multiple proximity sensors (e.g., three or more proximity sensors)) relative to known locations (e.g., location of park features 12, location of park attractions 14, specific parts of park attractions 14 (e.g., entrances). For example, three proximity sensors may be utilized to determine a position of a guest at a certain moment in time. In addition, in certain embodiments, the position of a guest 50 at a certain moment in time may be compared to a known location (e.g., of a park feature 12, of an attraction 14, of a specific part of an attraction 14 (e.g., entrance)). The difference in location may be determined to be the distance between the guest 50 and the known location. The distance between the guest and the location of a park feature 12 may be used to determine if a guest 50 is within a threshold range 24 of a park feature 12. For example, if the distance between the guest and a location of a park feature 12 is less than or equal to the threshold range 24 of the park feature 12, it may be determined that the guest 50 is within the threshold range of the park feature 12. The AI entity management system 16 and/or a separate control system (e.g., controller, processor) communicatively coupled with the AI entity management system 16 may make this determination. Additionally, data from one proximity sensor 18, 18A may be used to determine if a guest 50 is within a threshold range of a park feature 12. For example, data from one proximity sensor 18, 18A may be used to determine the distance between a guest 50 and that proximity sensor 18, 18A. In certain embodiments, this distance may be used in conjunction with the field of view of the proximity sensor 18, 18A to determine a position range defining all possible locations of the guest 50 relative to the proximity sensor 18, 18A. The locations within the position range may be compared with the location of the park feature 12. If the distance between every location within the position range and the park feature 12 are within a threshold range 24 of the park feature 12, then the guest 50 may be determined to be within the threshold range 24 of the park feature 12. Similar methods may be utilized. For example, if every point within the detection range and field of view of a proximity sensor 18, 18A is within a threshold range 24 of a park feature 12, then a guest 50 detected by the proximity sensor 18, 18A is within the threshold range 24 of the park feature 12. Similar methods may be used to determine if a guest 50 is within a threshold distance or threshold range of a park attraction 14 or a specific locations of a park attractions 14. In addition, in certain embodiments, the techniques described herein for determining location of a guest 50 using proximity sensors 18, 18A may be extended to determining the location of a particular location (e.g., a ride vehicle 20, and so forth) using these techniques, and then similarly determining a location of the guest 50 relative to the particular location. To accurately detect and/or determine the presence of the nearby guest 50 and/or associated object 51, the proximity sensors 18, 18A may be positioned near a loading point for a ride vehicle 20 and/or on a ride vehicle seat. In certain embodiments, readable IDs 19 and/or cameras 18, 18B may be used alone or in conjunction with other sensors 18 (e.g., force (e.g., weight) sensors 18, 18D and/or proximity sensors 18, 18A) to detect and/or determine the presence of a particular guest 50 and/or to identify a particular guest 50.

Additionally or alternatively, in certain embodiments, third party applications 54 may provide input data to the AI entity management system 16. That is, the third party applications 54 may be enabled (e.g., with guest permission) to share data with the AI entity management system 16. The third party applications 54 may include systems associated with third parties, and this may include entities that do not have a direct relationship with the amusement park 10. The third party applications 54 may provide third party data from one or more third parties collected through their websites, mobile applications, and/or other platforms. The third party applications 54 may include, but are not limited to, social media applications, medical applications, and/or bank applications. As such, the third party data from the third party applications 54 may include data associated with the social media applications, medical applications, and/or bank applications.

In certain embodiments, the guest mobile devices 34 may provide input data to the AI entity management system 16. For example, in certain embodiments, the guest mobile devices 34 may include one or more sensors 18 that facilitate the collection of data relating to activity of an associated guest 50 within the physical environment of the amusement park 10, as described in greater detail herein. In addition, in certain embodiments an associated guest mobile device 34 may be enabled to share device data with the AI entity management system 16 (e.g., upon permission received from the guest 50, an associated guest mobile device 34 may be enabled to share device data with the AI entity management system 16). The device data may include, but is not limited to, images and/or video stored on or accessible to the guest mobile device 34, a GPS location of the guest mobile device 34, tracking data determined by the guest mobile device 34 (e.g., steps taken per day, average screen time, historical GPS data, etc.), and/or setting preferences (e.g., larger text, color theme, special accessibility features enabled, etc.).

As described above with respect to FIG. 1, in certain embodiments, the guest-specific AI entity system 32 may include a monitoring system 28 and/or a service desk 30. Although the following discussions describe the monitoring system 28 and the service desk 30 as separate components of the guest-specific AI entity system 32, these components may communicate with each other (e.g., as indicated by the dashed line) or be integrated into a single system (e.g., where the service desk 30 is part of the monitoring system 28). The monitoring system 28 may be an administrative system that monitors the sensors 18 and the park features 12. For example, the monitoring system 28 may monitor control signals to change the park features 12 sent from the AI entity management system 16 in response to the presence and identification of particular guests 50, as described in greater detail herein. In particular, the monitoring system 28 may ensure that the sensors 18 and the park features 12 function as expected and/or provide the customized interactions via guest-specific AI entities 36 as expected for particular guests 50.

Additionally, in certain embodiments, if the AI entity management system 16 is not functioning as expected (e.g., generating erroneous control signals), the monitoring system 28 may control (e.g., instruct) and/or reconfigure the AI entity management system 16. For example, the monitoring system 28 may reset or recalibrate the sensors 18 and/or the park features 12 and/or override control signals for the park features 12 (e.g., as originally determined and/or instructed by the AI entity management system 16). In certain embodiments, the monitoring system 28 and the AI entity management system 16 may be implemented as a single controller.

In certain embodiments, the service desk 30, which may include human and/or virtual service agents, may stop (e.g., manually) the activation (e.g., instructing, continued functioning) of guest-specific AI entities 36 via a stopping system (e.g., mechanism (e.g., button, lever, dial, switch), keyboard input, touchscreen input, control pad input, instructions (e.g., code instructions, (e.g., stored in a memory (e.g., memory 46)))) to override control signals from the AI entity management system 16 if the service desk 30 finds any issues with the guest-specific AI entities 36 beyond those determined by the AI entity management system 16. Since guests 50 may be tracked, as described herein (e.g., via guest-wearable readable IDs 19, 19A, for example), the service desk 30 may monitor activity of the guests 50 and use this information to address unexpected delays or unexpected functions at the amusement park 10. By way of example, the tracked activity may indicate that a guest 50 has attempted to ride a particular roller coaster but was stationary or approximately stationary at the roller coaster zone for a particular duration beyond a threshold duration, indicating an unexpected delay or queues and/or unexpected performance by the roller coaster. In certain embodiments, the monitoring system 28 and/or the AI entity management system 16, based on the detected and/or determined unexpected activity, data indicative of unexpected activity, and/or data determined to be indicative of unexpected activity, may send an alert to the service desk 30 and/or instruct the service desk 30 to resolve such issues.

The communication circuitry 48 of the AI entity management system 16 may enable the AI entity management system 16 to interface with various electronic devices, such as the monitoring system 28, the service desk 30, the park features 12, and/or the guest mobile devices 34. For example, in certain embodiments, the monitoring system 28 and/or the service desk 30 may communicate with the AI entity management system 16 to receive and/or send information (as indicated by double-headed arrow) to ensure that the AI entity management system 16 and/or the park features 12 are operating as expected. Additionally or alternatively, in certain embodiments, the communication circuitry 48 may enable the AI entity management system 16 to interface with components of the park features 12. For example, the communication circuitry 48 may enable the AI entity management system 16 to communicatively couple to a network, such as a personal area network (PAN), a local area network (LAN), and/or a wide area network (WAN). In certain embodiments, the communication circuitry 48 may be separate from (e.g., physically separate from) the AI entity management system 16 but communicatively coupled with the AI entity management system 16.

In certain embodiments, the AI entity management system 16 may process data received from sensors 18 via an input device 42, determine presence of and identify particular guests 50, determine and/or analyze guest data associated with the particular guests 50 (e.g., data associated with respective user IDs 52), determine modifications to guest-specific AI entities 36 (e.g., modifications to personalities of the guest-specific AI entities 36, among other modifications), determine modifications to interactions via certain park features 12 (e.g., activation, deactivation, customization, and/or modifications of functions and/or outputs of the park features 12) to facilitate customized experiences for the guests 50 (e.g., via simulation of the existence of the guest-specific AI entities 36, the presentation of story-related aspects, and so forth), and communicate the instructions to implement the modifications to interactions via to the park features 12 (e.g., activation deactivation, customization, and/or modifications of functions and/or outputs of the park features 12) via the communication circuitry 48. For example, after processing (e.g., analyzing) sensor data received via the input device 42, the processor 44 of the AI entity management system 16 may determine instructions (e.g., a control signal, control data) that instructs and/or enables the communication circuitry 48 to wirelessly transmit instructions (e.g., a control signal, control data) to the park features 12 to instruct and/or enable activation of the modifications to interactions via the park features 12. In certain embodiments, a park feature 12 may comprise separate communication circuitry (e.g., transmitters, receivers, transceivers) to enable communication with communication circuitry 48. In other embodiments, the communication circuitry 48 may be connected via a wired connection to the park features 12.

For example, as described in greater detail herein, the detected activity of the guests 50 may relate movement (e.g., including physical gestures) of the guests 50 within a physical environment of the amusement park 10, interactions of the guests 50 with certain attractions 14 of the amusement park 10, and so forth. However, in other embodiments, the detected activity of the guests 50 may relate to activity that does not occur within the amusement park 10. For example, in certain embodiments, the guests 50 may be remotely located relative to the amusement park 10 but may still be considered (e.g., remote) guests of the amusement park 10. A few non-limiting examples include guests 50 that are interacting with the amusement park 10 through a remote application (e.g., being run on guest mobile devices 34 associated with the guests 50 or other devices, such as a set top boxes or other devices installed at certain locations to enable remote access to the amusement park 10) from their homes, guests 50 that are interacting with the amusement park 10 through a remote application (e.g., being run on guest mobile devices 34 associated with the guests 50 or other devices, such as a set top boxes or other devices installed at certain locations to enable remote access to the amusement park 10) at other remote locations (e.g., hotel rooms, and so forth) relative to the amusement park 10, and so forth. Furthermore, in other embodiments, the detected activity of the guests 50 may relate to interaction of the guests 50 with a digital environment associated with the amusement park 10. As such, although certain guest experiences may occur within the amusement park 10, other guest experiences may occur remotely from the amusement park 10. A non-limiting list of examples may include virtual reality, augmented reality, traditional living room experiences with audio/video, application experiences, living room lighting experiences only available when tuned into the amusement park 10, hotel experiences as an extension of out the window views, external to park location based extensions of the amusement park 10 including pop-up, permanent, and mobile (e.g., bus, boat, car) modes.

In addition, as described in greater detail herein, the analysis of the data indicative of the activity of the guests 50 performed by the AI entity management system 16 may include tracking interactions of the guests 50 with various attractions 14 and/or park features 12 of the amusement park 10; recognizing certain types of activity (e.g., certain identifiable types of movements, for example, gestures such as hand movements, leg movements, head movements, full body movements, voice inflections, and other perceivable actions); adjusting for the context of the recognized types of activity (e.g., certain hand movements may have different connotations with respect to different attractions 14 and/or park features 12); determining whether the data indicative of the activity of the guests 50 is even relevant for a particular use; and so forth.

The processor 44 of the AI entity management system 16 may include one or more processing devices that receive input signals from the input device 42 relating to the presence and/or identification of guests 50, which may then be used to determine modifications to interactions via certain park features 12 (e.g., activation, deactivation, customization, and/or modification of functions of the park features 12) to facilitate customized experiences for the guests 50 (e.g., via simulation of the existence of the guest-specific AI entities 36, the presentation of story-related aspects, and so forth), using techniques described herein. The memory 46 of the AI entity management system 16 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 44 of the AI entity management system 16 or by other processor-based devices. The processor 44 of the AI entity management system 16 may include a processing core to execute machine-executable instruction algorithms stored in the memory 46 of the AI entity management system 16. The processor 44 of the AI entity management system 16 may also include processor-side interfaces for software applications running on the processing core to interact with hardware components such as the park features 12 described herein. In certain embodiments, the memory 46 of the AI entity management system 16 may store guest data corresponding to tracked guest activity and park activity and/or corresponding to preferences of the guests 50 (e.g., by manual input from the guests 50 and/or as determined by processing an algorithm executed by the processor 44 of the AI entity management system 16). In certain embodiments, the memory 46 of the AI entity management system 16 may tag (e.g., append) the guest data with the corresponding user IDs 52 prior to storing it for subsequent retrieval. That is, in certain embodiments, the AI entity management system 16 may retrieve data associated with the guest 50 by looking up an ID 52 and using the associated guest data.

By way of example, in the amusement park setting described herein (and illustrated in FIG. 1), the stored algorithms may include, but are not limited to, algorithms to determine the guest presence based on sensor data from the sensors 18, identify particular guests 50 (e.g., by processing sensor data from cameras 18, 18B and performing facial recognition, processing sensor data from sound sensors (e.g., microphones) 18, 18E and performing sound input and voice recognition, and/or processing sensor data from readable IDs 19, 19A that are associated with user IDs 52 for the guests 50), retrieve guest data for the user IDs 52, determine modifications to interactions (e.g., activation, deactivation, customization, and/or modification of functions (e.g., outputs) of the park features 12) within the amusement park 10 based on the guest data, and provide a modified image, sound, lighting effect, actuation or animation instructions (e.g., stored in the memory 46) based on the guest data (e.g., indicating preferences or guest information that modifies one or more guest-specific AI entities 36 associated with the guests 50). In this manner, the AI entity management system 16 may determine the presence of a particular guest 50 and control (e.g., instruct) park features 12 accordingly, for example, when the particular guest 50 is within a predetermined range of the park features 12 and/or when the guest 50 is determined to be oriented towards the park features 12.

In addition, in certain embodiments, the AI entity management system 16 may enable the guest-specific AI entities 36 to exist in a digital environment separate from (e.g., but, perhaps, corresponding to (e.g., directly, indirectly) the physical environment of the amusement park 10, and to take digital actions within the digital environment based on an identity, details, personality traits, mood, preferences, and so forth, of the particular guest-specific AI entities 36 that are determined by the AI entity management system 16 based on the data collected with respect to activity of their respective guests 50 in the amusement park 10. In addition, in such embodiments, locations and/or actions of the guest-specific AI entities 36 within the digital environment, which may be separate from the locations and/or actions of their respective guests 50 in the amusement park 10, may function as the triggering source for physical interactions that are caused in the physical environment of the amusement park 10, as described in greater detail herein.

Figure 3:
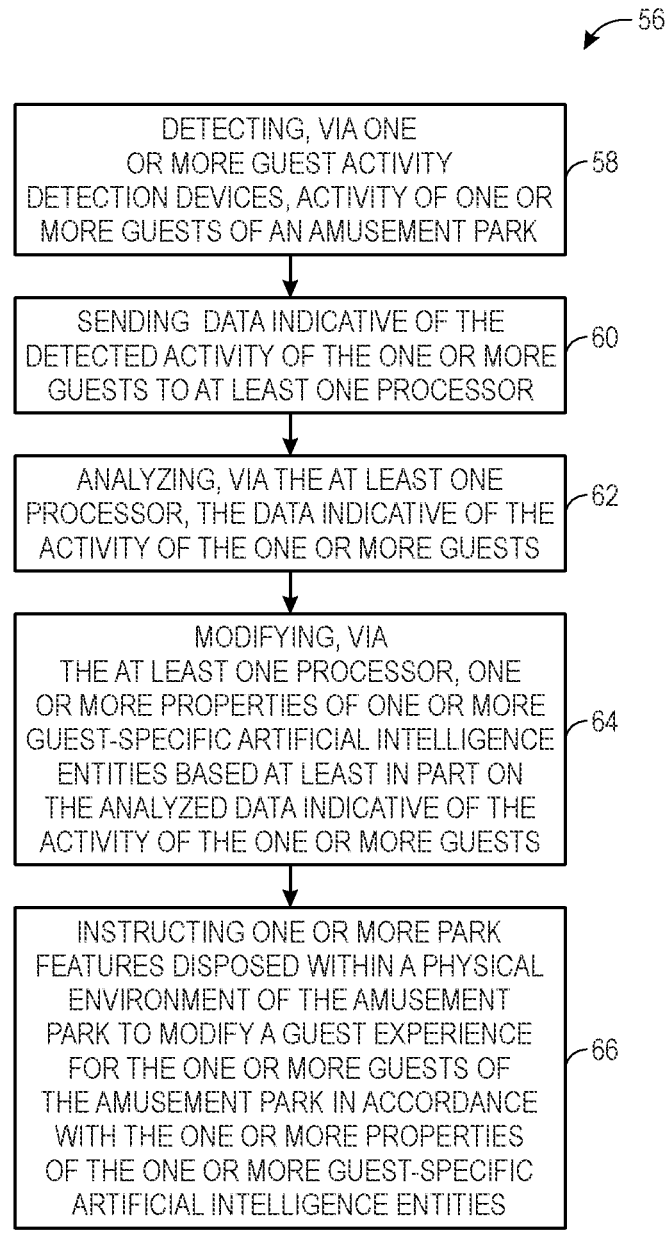
FIG. 3 is a flow diagram of a method of operating the guest-specific AI entity system of FIG. 2, in accordance with an embodiment of the present disclosure.

As such, as described in greater detail herein, the guest-specific AI entity system 32 illustrated in FIG. 2 is configured to manage guest-specific AI entities 36 that are associated with particular guests 50 of the amusement park 10 illustrated in FIG. 1. FIG. 3 is a flow diagram of a method 56 of operating the guest-specific AI entity system 32 of FIG. 2. As illustrated, in certain embodiments, the method 56 includes detecting, via one or more guest activity detection devices (e.g., the sensors 18 described herein) activity of one or more guests 50 of the amusement park 10 (block 58). In addition, in certain embodiments, the method 56 includes sending, (e.g., via the one or more guest activity detection devices, communication circuitry external to the guest activity detection devices (e.g., external communication circuitry communicatively coupled with the guest activity detection devices)), data indicative of the detected activity of the one or more guests 50 (block 60), for example, to the AI entity management system 16 for analysis.

As described in greater detail herein, in certain embodiments, the detected activity of the one or more guests 50 may relate movement (e.g., including physical gestures) of the one or more guests 50 within a physical environment of the amusement park 10, interactions of the one or more guests 50 with certain attractions 14 of the amusement park 10, and so forth. However, in other embodiments, the detected activity of the one or more guests 50 may relate to activity that does not occur within the amusement park 10. For example, in certain embodiments, the one or more guests 50 may be remotely located relative to the amusement park 10 but may still be considered (e.g., remote) guests of the amusement park 10. A few non-limiting examples include one or more guests 50 that are interacting with the amusement park 10 through a remote application (e.g., being run on guest mobile devices 34 associated with the one or more guests 50 or other devices, such as a set top boxes or other devices installed at certain locations to enable remote access to the amusement park 10) from their homes, one or more guests 50 that are interacting with the amusement park 10 through a remote application (e.g., being run on guest mobile devices 34 associated with the one or more guests 50 or other devices, such as a set top boxes or other devices installed at certain locations to enable remote access to the amusement park 10) at other remote locations (e.g., hotel rooms, and so forth) relative to the amusement park 10, and so forth. Furthermore, in other embodiments, the detected activity of the one or more guests 50 may relate to interaction of the one or more guests 50 with a digital environment associated with the amusement park 10.

In addition, in certain embodiments, the method 56 includes analyzing, via the AI entity management system 16, the data indicative of the activity of the one or more guests

50 (block 62). For example, as described in greater detail herein, the analysis of the data indicative of the activity of the one or more guests 50 may include tracking interactions of the one or more guests 50 with various attractions 14 and/or park features 12 of the amusement park 10; recognizing certain types of activity (e.g., certain identifiable types of movements, for example, gestures such as hand movements, leg movements, head movements, full body movements, voice inflections, and other perceivable actions); adjusting for the context of the recognized types of activity (e.g., certain hand movements may have different connotations with respect to different attractions 14 and/or park features 12); determining whether the data indicative of the activity of the one or more guests 50 is even relevant for a particular use; and so forth.

In addition, in certain embodiments, the method 56 also includes modifying, via the AI entity management system 16, one or more properties of one or more guest-specific AI entities 36 for each guest 50 of the one or more guests 50 based at least in part on the analyzed data indicative of the activity of the respective guest 50 of the one or more guests 50 (block 64). For example, as described in greater detail herein, the one or more properties of the one or more guest-specific AI entities 36 may include identities, character details, personality traits, moods, preferences, and so forth, of the one or more guest-specific AI entities 36; locations of the one or more guest-specific AI entities 36 within a digital environment associated with the amusement park 10; actions for the one or more guest-specific AI entities 36 to cause (e.g., via one or more park features 12) in the physical environment of the amusement park 10; actions for the one or more guest-specific AI entities 36 to cause in a digital environment associated with the amusement park 10; and so forth.

In addition, in certain embodiments, the method 56 further includes instructing, via the one or more guest-specific AI entities 36, one or more park features 12 disposed within a physical environment of the amusement park 10 to modify a guest experience for the one or more guests 50 in accordance with one or more properties of the one or more guest-specific AI entities 36 (block 66). For example, as described in greater detail herein, the one or more guest-specific AI entities 36 may instruct the one or more park features 12 to present certain images and/or video (e.g., including augmented reality and virtual reality images and/or video), lighting effects, animated figure movements, sounds, and so forth, to represent certain story elements, among other things.

As described in greater detail herein, in certain embodiments, the one or more guest activity detection devices that are used to collect data that is used to analyze activity of the one or more guests 50 may include one or more proximity sensors 18, 18A configured to detect and/or determine the presence of a guest 50 of the one or more guests 50 at a location within the physical environment of the amusement park 10. In addition, in certain embodiments, the one or more guest activity detection devices that are used to collect data that is used to analyze activity of the one or more guests 50 may include one or more cameras 18, 18B configured to detect and/or determine the presence of a guest 50 and/or detect data indicative of the presence of a guest 50 of the one or more guests 50 at a location within the physical environment of the amusement park 10, to determine an identity of the guest 50 of the one or more guests 50 (e.g., based on the detected and/or determined presence of a guest 50 and/or data indicative of detected and/or determines presence of a guest 50), to send data indicative of a presence of a guest 50 to presence to the AI entity management system 16 and/or other control system (e.g., controller, processor) wherein the AI entity management system 16 and/or other control system may determine using the data indicative of a guest presence 50 to determine a presence and/or an identity of the guest 50 of the one or more guests 50, or some combination thereof. In addition, in certain embodiments, the one or more guest activity detection devices that are used to collect data that is used to analyze activity of the one or more guests 50 may include one or more electronic readers 18, 18C configured to detect and/or determine the presence of one or more readable IDs 19, 19A associated with the one or more guests 50 at locations within the physical environment of the amusement park 10. As described in greater detail herein, in certain embodiments, the one or more readable IDs 19, 19A may be integrated into a wearable device configured to be associated with (e.g., worn by) the one or more guests 50. In addition, in certain embodiments, the one or more guest activity detection devices that are used to collect data that is used to analyze activity of the one or more guests 50 may include a force sensor (e.g., weight sensor) 18, 18D configured to detect and/or determine the presence of a guest 50 and/or data indicative of the presence of a guest 50 of the one or more guests 50 at a location within the physical environment of the amusement park 10, to send data indicative of a presence of a guest 50 to the AI entity management system 16 and/or other control system (e.g., controller, processor) wherein the AI entity management system 16 and/or other control system may determine the presence using the data indicative of a guest presence 50 to determine a presence a guest 50 of the one or more guests 50, or some combination thereof. In addition, in certain embodiments, the one or more guest activity detection devices that are used to collect data that is used to analyze activity of the one or more guests 50 may include one or more sound sensors (e.g., microphone) 18, 18E configured to detect sounds generated by a guest 50 of the one or more guests 50, to send data indicative of a presence of a guest 50 to the AI entity management system 16 and/or other control system (e.g., controller, processor) wherein the AI entity management system 16 and/or other control system may determine the presence using the data indicative of a guest presence 50 to determine a presence a guest 50 of the one or more guests 50, or some combination thereof.

In addition, in certain embodiments, the one or more park features 12 that may be instructed by the AI entity management system 16 may include one or more displays 12, 12A configured to display a guest-specific AI entity 36 of the one or more guest-specific AI entities 36. In addition, in certain embodiments, the one or more park features 12 that may be activated by the AI entity management system 16 may include a lighting effect system 12, 12B configured to generate light associated with a guest-specific AI entity 36 of the one or more guest-specific AI entities 36. In addition, in certain embodiments, the one or more park features 12 that may be activated by the AI entity management system 16 may include one or more animated FIGS. 12, 12C configured to simulate the existence of a guest-specific AI entity 36 of the one or more guest-specific AI entities 36 (e.g., via actuation, audio, video lighting, other effects). In addition, in certain embodiments, the one or more park features 12 that may be activated by the AI entity management system 16 may include a sound effect system 12, 12D configured to generate sound associated with a guest-specific AI entity 36 of the one or more guest-specific AI entities 36.

Figure 4:
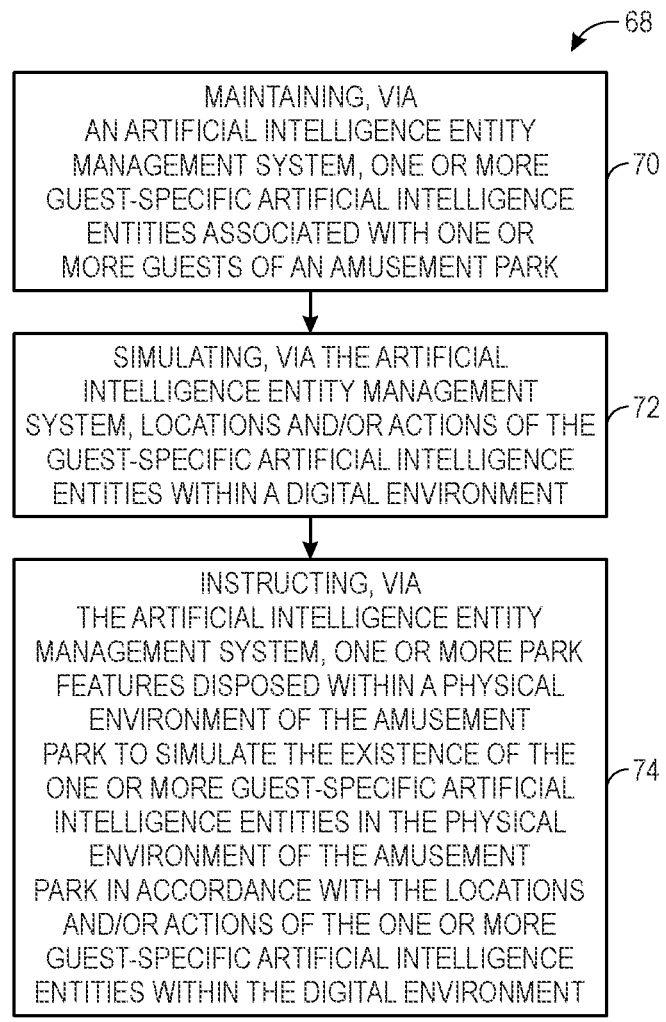
FIG. 4 is a flow diagram of a method of operating the guest-specific AI entity system of FIG. 2, in accordance with an embodiment of the present disclosure.

In addition, as described in greater detail herein, in certain embodiments, the AI entity management system 16 may be configured to simulate activities of one or more guest-specific AI entities 36 within a digital environment that is separate from (e.g., but, perhaps, corresponding to) the physical environment of the amusement park 10, and to instruct one or more park features 12 disposed within the physical environment of the amusement park 10 to simulate the existence of the one or more guest-specific AI entities 36 in the physical environment of the amusement park 10. FIG. 4 is a flow diagram of a method 68 of operating the guest-specific AI entity system 32 of FIG. 2. As illustrated, in certain embodiments, the method 68 includes maintaining (e.g., storing in memory, instructing updates to, instructing customization to), via the AI entity management system 16, one or more guest-specific AI entities 36 associated with one or more guests 50 of the amusement park 10 (block 70).

In addition, in certain embodiments, the method 68 includes simulating, via the AI entity management system 16, locations and/or actions of the guest-specific AI entities 36 within a digital environment (block 72). For example, the AI entity management system 16 or a separate control system (e.g., controller, processor) may simulate and/or instruct simulation of a digital environment (e.g., create and/or update the digital environment (e.g., virtual locations and/or virtual features within the digital environment) to correspond to (e.g., mimic, represent, create an output to appear alike or similar to)) locations and/or features within a physical environment (e.g., the physical environment of amusement park 10). The AI entity management system 16 or a separate control system (e.g., controller, processor) may simulate action of the guest-specific AI entities 36 within the digital environment (e.g., instruct the guest-specific AI entities 36 to move about the digital environment separately from the associated guests' movements within the physical environment of the amusement park 10, to act as a triggering source of actions within the physical environment of the amusement park 10 that correspond to the locations of the guest-specific AI entities 36 and/or actions of the guest-specific AI entities 36 within the digital environment (e.g., that correspond to the physical environment of the amusement park 10), and so forth.

In addition, in certain embodiments, the method 68 also includes instructing, via the AI entity management system 16, one or more park features 12 disposed within a physical environment of the amusement park 10 to simulate the existence of the one or more guest-specific AI entities 36 in the physical environment of the amusement park 10 in accordance with the locations and/or actions of the one or more guest-specific AI entities 36 within the digital environment (block 74). In addition, in certain embodiments, the AI entity management system 16 may simulate the locations and/or actions of the one or more guest-specific AI entities 36 within the digital environment based at least in part on activity of the one or more guests 50 within the physical environment of the amusement park 10 detected and/or determined by one or more guest activity detection devices (e.g., the sensors 18 described herein). In addition, the guest-specific AI entities 36 may learn from the activity of their associated guests 50 and may interact with the digital environment in a manner that the guest-specific AI entities 36 are taught to believe would be consistent with their associated guests' behavior. As but one non-limiting example, Google Maps and other online mapping platforms may represent one version of a digital parallel world that directly corresponds to the real, physical world. In certain embodiments, a guest-specific AI entity 36 may walk about Google Maps and have a global positioning system (GPS) coordinate the correlates to the physical world. This GPS position of the guest-specific AI entity 36 may function as a trigger source for a virtual sensor (e.g., a sensor in the digital world) that may impact the physical world or start a real-world simulated interaction. Of course, the digital world is not constrained by the physical world, but can have representative constraints, parallel constraints, non-relational constraints (e.g., a constraint that does not pertain to the physical world), partially represents real-world constraints, or attempts to fully be constrained by the physical world.

In addition, in certain embodiments, the triggering source for instructing the one or more park features 12 disposed within a physical environment of the amusement park 10 to simulate the existence of the of the one or more guest-specific AI entities 36 in the physical environment of the amusement park 10 may include one or more gestures (e.g., hand movements, leg movements, head movements, full body movements, voice inflections, and other perceivable actions) performed by one or more guests 50 within the physical environment of the amusement park 10 or within the digital environment described above.

Figure 5:
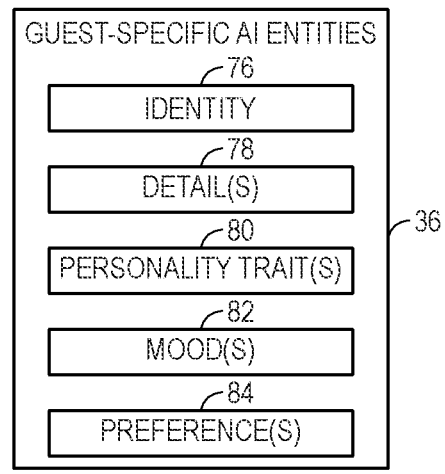
FIG. 5 illustrates various properties of guest-specific AI entities, which may be managed by the guest-specific AI entity system of FIG. 2, in accordance with an embodiment of the present disclosure.

As illustrated in FIG. 5, in certain embodiments, the one or more properties of the one or more guest-specific AI entities 36 may include an identity 76 of the one or more guest-specific AI entities 36, one or more details 78 about the one or more guest-specific AI entities 36, one or more personality traits 80 of the one or more guest-specific AI entities 36, a mood 82 of the one or more guest-specific AI entities 36, one or more preferences 84 of the one or more guest-specific AI entities 36, or some combination thereof. For example, an identity 76 of a particular guest-specific AI entity 36 may be a specific, relatively well-known themed character, for example, for a specific themed zone of the amusement park 10. In certain embodiments, a guest 50 may select a particular character that they would like to have follow them throughout their visit to the amusement park 10 and/or to the specific themed zone of the amusement park 10 as a guest-specific AI entity 36, or a particular character may be automatically selected by the AI entity management system 16 to be a guest-specific AI entity 36 for a particular guest 50, for example, based on tracked activity of the guest 50 (e.g., the guest 50 showing a particular affinity for the particular character, the guest 50 showing a fear of the particular character, and so forth). It will be appreciated that specific themed characters may have details 78 (e.g., back-story details, place of origin, faction alliances, friends, foes, goals, motivations, and so forth) that are specific to the themed characters. In addition, a particular guest-specific AI entity 36, regardless of whether it is a specific, relatively well-known themed character or an entirely customized character, may have particular personality traits 80, such as happiness, sadness, humor, blandness, bravery, cowardice, passivity, aggressiveness, belligerence, submissiveness, meanness, kindness, sarcasm, respectfulness, and so forth. In addition, a particular guest-specific AI entity 36 may have particular moods 82 that are substantially similar to the personality traits 80, but which are more temporary in nature, as opposed to the more permanent personality traits 80. In addition, a particular guest-specific AI entity 36 may have particular preferences 84, such as activities in which they like to participate, areas of the amusement park 10 that they prefer, other themed characters that they have an affinity for or aversion to, and so forth.

In general, the guest-specific AI entities 36 described herein may learn certain properties over time based on activity of their associated guests 50 with respect to the amusement park 10 such that the guest-specific AI entities 36 evolve (e.g., change, are modified) over time. However, in certain embodiments, guests 50 may interact with the AI entity management system 16 to stop certain guest-specific AI entities 36 from further learning to, for example, lock in (e.g., prevent change of, partially prevent change of) a particularly nostalgic guest-specific AI entity 36 having a set of properties that is particularly desirable. In addition, in certain embodiments, the guests 50 may interact with (e.g., instruct) the AI entity management system 16 to save copies of such particular versions of guest-specific AI entities 36 so that they may utilize them and, indeed, further train them during future visits to the amusement park 10.

Figure 6:
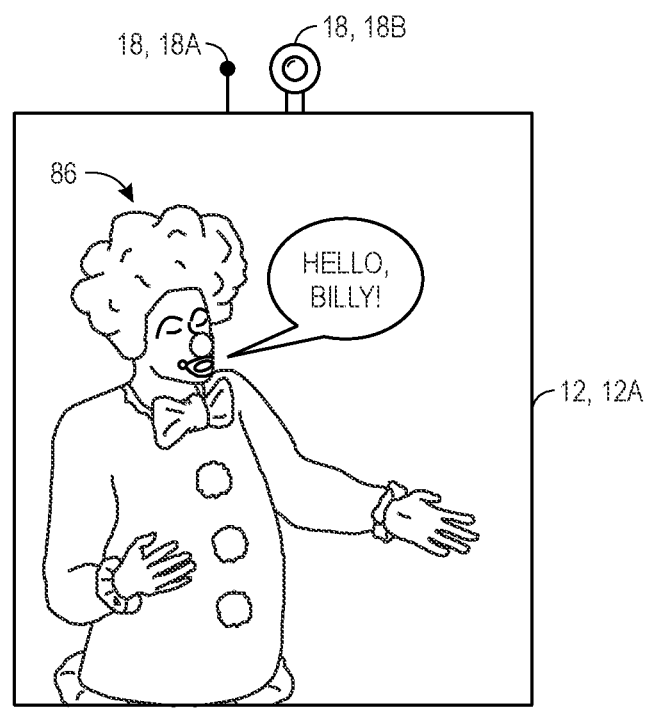
FIG. 6 illustrates a display via which a guest-specific AI entity may be manifested, in accordance with an embodiment of the present disclosure.

FIG. 6 illustrates a non-limiting example of how the guest-specific AI entities described herein may be manifested as the guests 50 move around the amusement park 10. For example, FIG. 6 illustrates a display 12, 12A on which a character (e.g., clown 86, other character) may be presented. As described in greater detail herein, a particular guest-specific AI entity 36 may manifest itself by taking control of (e.g., instructing, modifying) one or more aspects of the clown 86 presented via the display 12, 12A when a guest 50 associated with the particular guest-specific AI entity 36 is detected and/or determined as moving in relatively close proximity to (e.g., within a threshold range of) the display 12, 12A (e.g., via one or more proximity sensors 18, 18A and/or one or more cameras 18, 18B) based on the properties of the particular guest-specific AI entity 36 (see, e.g., FIG. 5). The one or more aspects that the guest-specific AI entity 36 may take control of may include, but are not limiting, animations of the clown 86, dialog of the clown 86, special visual and/or audio effects related to the clown 86, and so forth. For example, if the guest data for a particular guest indicates that the particular guest 50 has a fear of clowns, the clown 86 may be cause by the AI entity management system 16 to speak in the general direction of the particular guest 50 in a relatively menacing manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system for utilizing guest-specific artificial intelligence entities, comprising:
   one or more guest activity detection devices configured to track activity and locations of a guest of an amusement park, and to send data indicative of the tracked activity and locations of the quest of the amusement park;
   an artificial intelligence entity management system configured to analyze the data indicative of the tracked activity and locations of the guest of the amusement park, and to modify one or more properties of a guest-specific artificial intelligence entity specific to the guest of the amusement park based at least in part on the analyzed data indicative of the tracked activity and locations of the guest of the amusement park; and
   one or more park features disposed within a physical environment of the amusement park and configured to be instructed by the guest-specific artificial intelligence entity specific to the guest of the amusement park to modify a guest experience for the guest of the amusement park in accordance with the one or more properties of the guest-specific artificial intelligence entity specific to the guest of the amusement park.

2. The system of claim 1, wherein the one or more guest activity detection devices comprise one or more proximity sensors configured to detect the presence of the guest of the amusement park at a location within the physical environment of the amusement park.

3. The system of claim 1, wherein the one or more guest activity detection devices comprise one or more cameras configured to detect the presence of the guest of the amusement park at a location within the physical environment of the amusement park, and wherein the artificial intelligence entity management system is configured to determine an identity of the guest of the amusement park.

4. The system of claim 1, wherein the one or more guest activity detection devices comprise one or more electronic readers configured to detect the presence of one or more readable identifiers associated with the guest of the amusement park at locations within the physical environment of the amusement park.

5. The system of claim 4, wherein the one or more readable identifiers are integrated into a wearable device configured to be associated with the guest of the amusement park.

6. The system of claim 1, wherein the one or more guest activity detection devices comprise a force sensor configured to detect the presence of the guest of the amusement park at a location within the physical environment of the amusement park.

7. The system of claim 1, wherein the one or more guest activity detection devices comprise one or more sound sensors configured to detect sounds generated by the guest of the amusement park.

8. The system of claim 1, wherein the one or more guest activity detection devices comprise one or more visual sensors configured to detect movement generated by the guest of the amusement park.

9. The system of claim 1, wherein the one or more park features comprise one or more displays configured to be instructed by the artificial intelligence entity management system to display the guest-specific artificial intelligence entity specific to the guest of the amusement park.

10. The system of claim 1, wherein the one or more park features comprise a lighting effect system configured to be instructed by the artificial intelligence entity management system to generate light associated with the guest-specific artificial intelligence entity specific to the guest of the amusement park.

11. The system of claim 1, wherein the one or more park features comprise one or more animated figures configured to be instructed by the artificial intelligence entity management system to simulate the existence of the guest-specific artificial intelligence entity specific to the guest of the amusement park.

12. The system of claim 1, wherein the one or more park features comprise a sound effect system configured to be instructed by the artificial intelligence entity management system to generate sound associated with the guest-specific artificial intelligence entity specific to the guest of the amusement park.

13. The system of claim 1, wherein the one or more properties of the guest-specific artificial intelligence entity specific to the guest of the amusement park comprise an identity of the guest-specific artificial intelligence entity specific to the guest of the amusement park, one or more details about the guest-specific artificial intelligence entity specific to the guest of the amusement park, one or more personality traits of the guest-specific artificial intelligence entity specific to the guest of the amusement park, a mood of the guest-specific artificial intelligence entity specific to the guest of the amusement park, one or more preferences of the guest-specific artificial intelligence entity specific to the guest of the amusement park, or some combination thereof.

14. A method for utilizing guest-specific artificial intelligence entities, comprising:
tracking, via one or more guest activity detection devices, data indicative of activity and locations of a guest of an amusement park;
sending the data indicative of the activity and locations of the guest of the amusement park to at least one processor;
analyzing, via at the least one processor, the data indicative of the activity and locations of the guest of the amusement park;
modifying, via the at least one processor, one or more properties of a guest-specific artificial intelligence entity specific to the guest of the amusement park based at least in part on the analyzed data indicative of the activity and locations of the guest of the amusement park; and
instructing, via the guest-specific artificial intelligence entity specific to the guest of the amusement park, one or more park features disposed within a physical environment of the amusement park to modify a guest experience for the guest of the amusement park in accordance with the one or more properties of the guest-specific artificial intelligence entity specific to the guest of the amusement park.

15. The method of claim 14, wherein instructing the one or more park features disposed within the physical environment of the amusement park is based at least in part on one or more gestures performed by the guest of the amusement park within the physical environment of the amusement park or within a digital environment representing the amusement park through use of the guest-specific artificial intelligence entity specific to the guest of the amusement park.

16. The method of claim 14, wherein instructing the one or more park features disposed within the physical environment of the amusement park comprises instructing one or more displays to display the guest-specific artificial intelligence entity specific to the guest of the amusement park.

17. The method of claim 14, wherein instructing the one or more park features disposed within the physical environment of the amusement park comprises activating a lighting effect system to generate light associated with the guest-specific artificial intelligence entity specific to the guest of the amusement park.

18. The method of claim 14, wherein instructing the one or more park features disposed within the physical environment of the amusement park comprises instructing one or more animated figures to simulate the existence of the guest-specific artificial intelligence entity specific to the guest of the amusement park.

19. The method of claim 14, wherein activating the one or more park features disposed within the physical environment of the amusement park comprises instructing a sound effect system to generate sound associated with the guest-specific artificial intelligence entity specific to the guest of the amusement park.

20. The method of claim 14, wherein the one or more properties of the guest-specific artificial intelligence entity specific to the guest of the amusement park comprise an identity of the guest-specific artificial intelligence entity specific to the guest of the amusement park, one or more details about the guest-specific artificial intelligence entity specific to the guest of the amusement park, one or more personality traits of the guest-specific artificial intelligence entity specific to the guest of the amusement park, a mood of the guest-specific artificial intelligence entity specific to the guest of the amusement park, one or more preferences of the guest-specific artificial intelligence entity specific to the guest of the amusement park, or some combination thereof.

21. The system of claim 1, wherein the one or more guest activity detection devices are configured to track activity and locations of a plurality of guests of the amusement park, and to send data indicative of the tracked activity and locations of the plurality of guests of the amusement park; wherein the artificial intelligence entity management system is configured to analyze the data indicative of the tracked activity and locations of the plurality of guests of the amusement park, and to modify one or more properties of a plurality of guest-specific artificial intelligence entities associated with the plurality of guests of the amusement park based at least in part on the analyzed data indicative of the tracked activity and locations of the plurality of guests of the amusement park, wherein each guest-specific artificial intelligence entity of the plurality of guest-specific artificial intelligence entities is specific to a respective guest of the plurality of guests of the amusement park; and wherein the one or more park features are configured to be instructed by the plurality of guest-specific artificial intelligence entities to modify a guest experience for the plurality of guests of the amusement park in accordance with the one or more properties of the plurality of guest-specific artificial intelligence entities.

22. A system for utilizing guest-specific artificial intelligence entities, comprising:
an artificial intelligence entity management system configured to modify one or more properties of a guest-specific artificial intelligence entity specific to a guest of an amusement park based at least in part on tracked activity and locations of the guest of the amusement park; and
one or more park features disposed within a physical environment of the amusement park, wherein the one or more park features are configured to be instructed by the guest-specific artificial intelligence entity specific to the guest of the amusement park to modify a guest experience for the guest of the amusement park in accordance with the one or more properties of the guest-specific artificial intelligence entity specific to the guest of the amusement park.

23. The system of claim 22, wherein the one or more park features are configured to be instructed by the guest-specific artificial intelligence entity specific to the guest of the amusement park to simulate the existence of the guest-specific artificial intelligence entity specific to the guest of the amusement park in the physical environment of the amusement park based at least in part on one or more gestures performed by the guest of the amusement park within the physical environment of the amusement park or within a digital environment representing the amusement park through use of the guest-specific artificial intelligence entity specific to the guest of the amusement park.

24. The system of claim 22, wherein the artificial intelligence entity management system is configured to simulate locations and/or actions of the guest-specific artificial intelligence entity specific to the guest of the amusement park within a digital environment based at least in part on the tracked activity and locations of the guest of the amusement park.

* * * * *